(No Model.)
J. A. G. O. WOLTERS.
CAR FENDER.
No. 572,235. Patented Dec. 1, 1896.
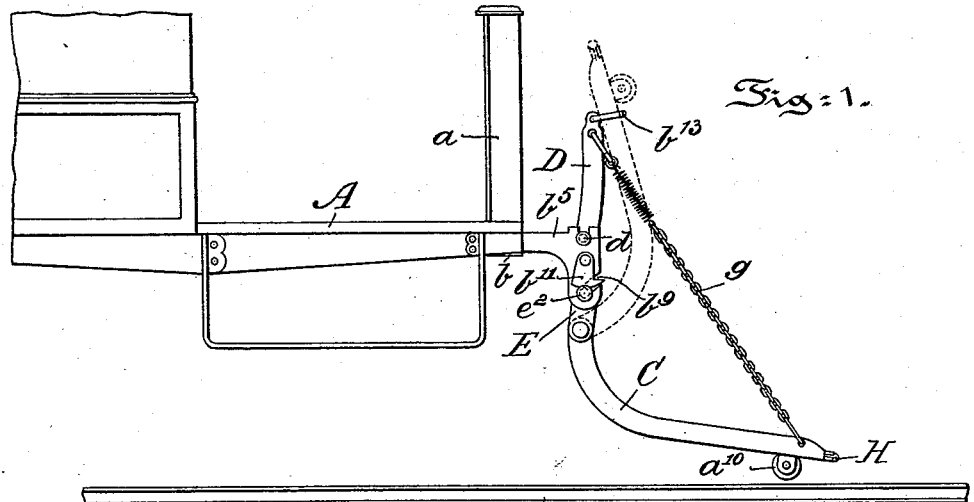
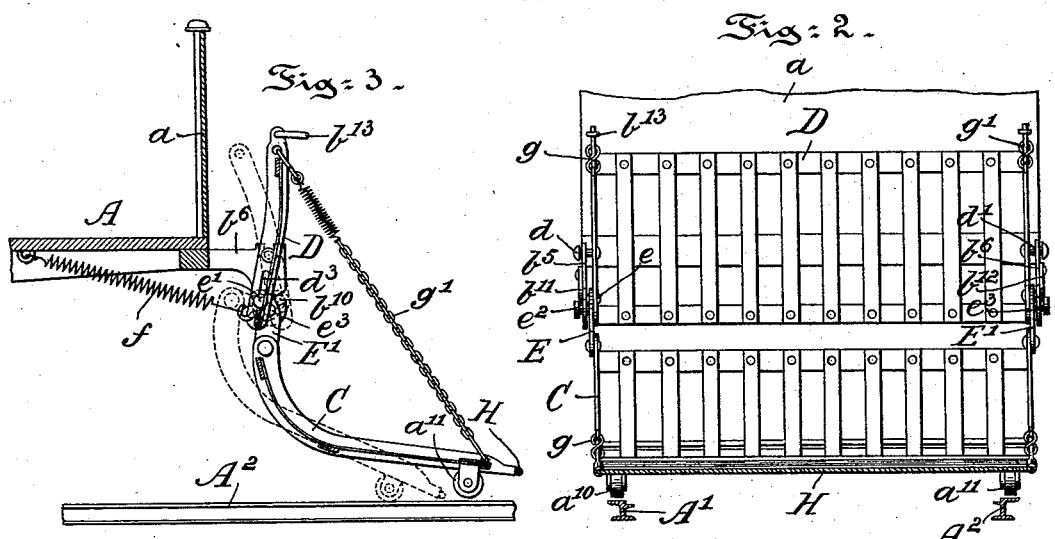
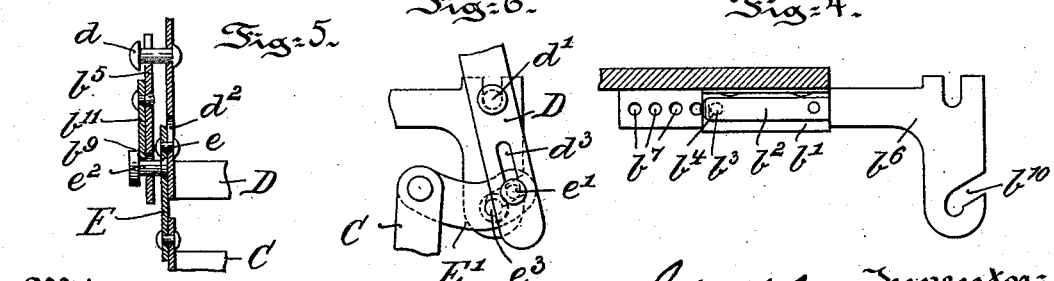
Witnesses:
Thomas M. Smith
Richard C. Maxwell
Inventor:
John A. G. O. Wolters,
By J. Walter Douglass
Attorney

UNITED STATES PATENT OFFICE.

JOHN A. G. O. WOLTERS, OF PHILADELPHIA, PENNSYLVANIA.

CAR-FENDER.

SPECIFICATION forming part of Letters Patent No. 572,235, dated December 1, 1896.

Application filed August 17, 1896. Serial No. 602,976. (No model.)

*To all whom it may concern:*

Be it known that I, JOHN A. G. O. WOLTERS, a subject of the Emperor of Germany, but who have declared my intention of becoming a citizen of the United States, and now residing at the city of Philadelphia, in the county of Philadelphia and State of Pennsylvania, have invented certain new and useful Improvements in Car-Fenders, of which the following is a specification.

My invention has relation to a safety guard or fender for motor-cars for preventing loss of life or limb; and it relates particularly to the general construction, arrangement, and mode of operation of such an appliance.

The principal objects of my invention are, first, to provide a simple, durable, and effective life-guard or safety device for electric or other motor-cars; second, to provide a fender for motor-cars so arranged as that the same may be readily elevated into inoperative position; third, to provide a fender or life-guard adapted to travel normally in operative position with a movable or slidable connection established between the same and the car; fourth, to provide a fender or life-guard having an apron in movable connection with a guard connected with and detachably supported from the car; fifth, to provide a fender or life-guard with a supported apron in movable connection with a guard and respectively connected with each other under spring-tension, whereby in the impact of an object against the apron the same is caused to move downward into an inclined position, as well as backward, and the guard to oscillate slightly in a forward direction and to be returned to initial position by a spring connected with the car and said guard, and, sixth, to provide a car-fender or life-guard supported from slidable rods latched to a clamp connected to the car and the fender proper, consisting of an apron movably connected with a guard and the two respectively adapted to oscillate one with respect to the other by the impact of an object against the apron and by the fall of the object into the same aided by the spring connections between the apron and guard and the latter with the car.

My invention, stated in general terms, consists of a car-fender or life-guard constructed and arranged in substantially the manner hereinafter described and claimed.

The nature and scope of my invention will be more fully understood from the following description, taken in connection with the accompanying drawings, forming part hereof, in which—

Figure 1 is a side elevational view of a fender or life-guard embodying features of my invention in application to a car. Fig. 2 is a front view of the same, showing in detail the apron and the guard in movable connection with each other. Fig. 3 is a side view of the fender, showing in full lines the normal position of the apron and detachably and slidably supported from the car and in dotted lines the operative positions, respectively, of the apron and guard of the fender under spring-tension induced by the impact of an object brought against the apron thereof. Fig. 4 is a similar view of one of the hook-supports connected with the clamp-bearing of the car, whereby the fender may be slid forward or backward in connection with the two supports at each side of the car. Fig. 5 is a similar view in broken sectional detail of the movable connections between the apron and its guard on one side thereof; and Fig. 6 is a similar view of the same, taken from the other side thereof.

Referring to the drawings, A in Figs. 1 and 3 is one end portion of the platform of a car provided with a dashboard $a$.

$b$ and $b'$ are perforated clamp-bearings secured to the under side of the platform of the car on each side thereof, and $b^2$ are spring metal catches rigidly secured at one end to the side of each of the said bearings $b$ and $b'$ and at their free ends provided with pins $b^3$, adapted to enter the perforations $b^4$, provided in the bearings $b$ and $b'$, for a purpose to be presently described.

$b^5$ and $b^6$ are slitted and crooked supports with tongues respectively adapted to enter the bearings $b$ and $b'$, and perforated at $b^7$, so that the pins $b^8$ of the catches may extend through the perforations $b^4$ of the bearings and of the tongues of the slitted and crooked supports $b^5$ and $b^6$, as clearly illustrated in Fig. 4 of the drawings.

C is a concave or curved metal or other material apron provided in front on the under side with rollers or flat-faced wheels $a^{10}$ and $a^{11}$, adapted to engage rails A' and $A^2$ of the road bed or way.

D is the convex or curved guard provided with stud-pins $d$ and $d'$, adapted to enter the slits in the supports $b^5$ and $b^6$. The lower side strips of the guard D are slitted at $d^2$ and $d^3$, and are engaged by the stud-pins or bolts $e$ and $e'$ of the curved link connections E and E', pivoted to the upper portions of the apron C. The said connections E and E' are provided with stud-pins $e^2$ and $e^3$, adapted to engage the crooked openings $b^9$ and $b^{10}$ of the supports $b^5$ and $b^6$. The apron C and guard D in the impact of an object against the front of the same tending to force the same in a downwardly-inclined direction will cause the link connections E and E' to assume a substantially longitudinal plane and the guard D to be thrown forward or into the position indicated in dotted lines in Fig. 3 of the drawings under the tension of the coiled spring $f$, connected with the platform A of the car and with the said guard. By the drop of the object or person onto the body of the apron C the guard D will then assume the position indicated in full lines in Figs. 1 and 3. The spring-applied chains or cords $g$ and $g'$, connected with the sides of the apron and guard, serve only to limit the extent of movement of the said two members of the fender in the impact of an object brought to bear against the apron to depress it into an inclined position. On the sides of the supports $b^5$ and $b^6$ are provided catches $b^{11}$ and $b^{12}$, adapted to be brought into a position to bear against the stud-pins $e^2$ and $e^3$ of the link connections E and E' and thereby to prevent disengagement of the members of the fender from their supports $b^5$ and $b^6$. The apron can be caused to assume an elevated or vertically inoperative position by engaging therewith the catches $b^{13}$, which are connected with the sides of the guard D, and the same be securely held close to the said guard D, and by releasing the pins $b^3$ of the spring-catches connected with the clamp-bearings $b$ and $b'$ the supports $b^5$ and $b^6$ may be slid rearwardly therein to bring the fender close to the front of the platform A of the car, as will be readily understood from Figs. 1 and 3 of the drawings.

In operation the fender by the impact of an object against the front of the apron C causes the same to bend downward into an inclined position and with the connections E and E', assuming thereby substantially a longitudinal plane, as in the working of the fender in the form shown in Figs. 1, 2, and 3 of the drawings. The front of the apron C, as shown in Figs. 1 and 3, may be provided slightly in advance thereof with a thick cord or rope H or a series of the cords to thus afford a yielding surface to the blow or impact of an object against the fender and thereby to prevent, as far as possible, any bruising of the limbs or maiming of the person by the same.

Having thus described the nature and objects of my invention, what I claim as new, and desire to secure by Letters Patent, is—

1. A car-fender, comprising a concave-shape apron, a convex-shape guard, curved link connections with said apron and guard, slidable and detachable spring-clamping supports for said fender and chains or cords connected with said apron and guard, substantially as and for the purposes described.

2. A car-fender, comprising a concave-shaped apron, a side-slotted guard, link connections located between said apron and the car, stud-pins projecting from said guard and connections and detachably engaging supports provided with perforated tongues adapted to be slid in bearings having spring-catches provided with pins, substantially as and for the purposes described.

3. A car-fender, comprising an apron linked to a guard having the lower part on each side slotted, said guard and links provided with pins engaging supports detachably connected with the car, a spring connected with said car and guard and chains or cords connected with said apron and guard, substantially as and for the purposes described.

4. A car-fender, comprising an apron, a guard, pivotal link connections with said apron and guard, supports provided with perforated tongues, perforated bearings held to position on said supports by spring-controlled catches provided with pins, said guard being normally held under spring-tension, substantially as and for the purposes described.

In testimony whereof I have hereunto set my signature in the presence of two subscribing witnesses.

JOHN A. G. O. WOLTERS.

Witnesses:
J. WALTER DOUGLASS,
THOMAS M. SMITH.